United States Patent
Hu et al.

(10) Patent No.: US 11,698,289 B2
(45) Date of Patent: Jul. 11, 2023

(54) METHOD PROVIDING INCREASED SIGNAL-TO-NOISE (SNR) FOR COHERENT DISTRIBUTED ACOUSTIC SENSING

(71) Applicant: NEC Laboratories America, Inc., Princeton, NJ (US)

(72) Inventors: Junqiang Nochur Hu, Davis, CA (US); Ting Wang, West Windsor, NJ (US); Shuji Murakami, Monmouth Junction, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/555,924

(22) Filed: Dec. 20, 2021

(65) Prior Publication Data

US 2022/0196461 A1   Jun. 23, 2022

Related U.S. Application Data

(60) Provisional application No. 63/128,957, filed on Dec. 22, 2020.

(51) Int. Cl.
*G01H 9/00* (2006.01)

(52) U.S. Cl.
CPC .................... *G01H 9/004* (2013.01)

(58) Field of Classification Search
None
See application file for complete search history.

(56) References Cited

U.S. PATENT DOCUMENTS

2018/0180451 A1*  6/2018  Wissem .............. G01D 5/268
2020/0370950 A1* 11/2020  Ip ...................... G01B 11/18

* cited by examiner

*Primary Examiner* — Lisa M Caputo
*Assistant Examiner* — Nigel H Plumb
(74) *Attorney, Agent, or Firm* — Joseph Kolodka (57) ABSTRACT

A method providing an increased signal-to-noise (SNR) characteristic for coherent distributed acoustic sensing (DAS) systems, the method employing fiber coils (microphones) made from sections of an optical sensing fiber that collect acoustic signals and uses multiple differential pairs of the microphones for signal averaging to improve the SNR. An analysis determines complex products (beating products) for a pair of locations that are part of a fiber microphone along the length of the optical sensing fiber that are used to determine a phase change in-between locations along the length of the optical sensing fiber.

3 Claims, 13 Drawing Sheets

METHOD PROVIDING INCREASED SIGNAL-TO-NOISE (SNR) FOR COHERENT DISTRIBUTED ACOUSTIC SENSING

CROSS REFERENCE TO RELATED APPLICATIONS

This application claims the benefit of U.S. Provisional Patent Application Ser. No. 63/128,957 filed 22 Dec. 2020 the entire contents of which is incorporated by reference as if set forth at length herein.

TECHNICAL FIELD

This disclosure relates generally to coherent distributed acoustic sensing (DAS). More particularly, it pertains to a method providing increased signal-to-noise (SNR) for coherent DAS.

BACKGROUND

As will be understood by those skilled in the art, DAS systems exploit a Rayleigh scattering effect in optical sensing fiber to detect changes in the fiber strain. Coherent distributed acoustic sensing (CO-DAS) using backscattered light exhibits a substantially linear response to fiber strain at any location along the fiber simultaneously. This characteristic is used to recover an acoustic signal from the environment, which enables the DAS to sense the acoustic environment in which the optical sensing fiber resides and "hear" acoustic events in that environment.

However, the acoustic stimulation of the optical sensing fiber through air is very weak, especially when an acoustic source is located a distance away from the optical sensing fiber. Fiber coil wrapped on acoustic sensitive material is sometimes used to enhance the stimulation level, but the detection distance and amplitude level is still limited due to limited SNR, and signal fluctuation further affects the performance. Accordingly, methods that increase the sensitivity of an optical sensing fiber to acoustic stimulation via the air while increasing its tolerance to signal fluctuations would represent a significant advance in the art.

SUMMARY

An advance in the art is made according to aspects of the present disclosure directed to a DAS method that utilizes a differential phase to detect phase change(s) between two locations of a DAS sensing fiber to ascertain vibrational/acoustic activities/environment at intermediary fiber location(s) between the two locations.

Additionally, systems, methods, and structures according to aspects of the present disclosure may employ a fiber coil comprising a segment of fiber wrapped in acoustic sensitive material ("acoustic signal collector"). The material responds to an environmental acoustic signal, which results in strain(s) applied to the fiber.

Furthermore, rather than using a measured phase difference between the two ends of the fiber coil, systems, methods, and structures according to aspects of the present disclosure utilize all samples collected from one end of the fiber coil to the other end of the fiber coil (the left side of the coil to the right side of the coil)—which may be extended further. Every two samples covering a partial or an entire section of the fiber coil are used as a pair (a "differential pair") to determine a phase difference and the results from all the pairs are averaged to form one output exhibiting a reduced noise level and more stable signal as compared to prior art methods.

Operationally, systems, methods, and structures according to aspects of the present disclosure use multiple differential pairs to determine a phase difference of each pair, and then add the results together to generate one, single output. Each pair covers—is associated with—either partial or an entire section of the fiber coil.

The combining advantageously occurs at either the complex domain after phase alignment, or after phase output with DC removed, to have fully synchronized phase to enhance output. Adaptive parameter tuning, including the fiber distance between the pairs ("beating gauge"), the starting and ending points, and so on, can be used to optimize the output.

BRIEF DESCRIPTION OF THE DRAWING

A more complete understanding of the present disclosure may be realized by reference to the accompanying drawing in which:

FIG. 6(A) and FIG. 6(B) illustrate a beating pair spanning both inside and outside of a microphone fiber and the SNR trend in which: FIG. 6(A) shows a change from a1 from 1 to n, and FIG. 6(B) is a plot showing a normalized SNR according to aspects of the present disclosure;

FIG. 7(A) and FIG. 7(B) illustrate a usable section outside of a microphone in which: FIG. 6(A) shows (q+a)>=n and FIG. 6(B) shows (q+a)<n, according to aspects of the present disclosure;

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

Figure 1A:
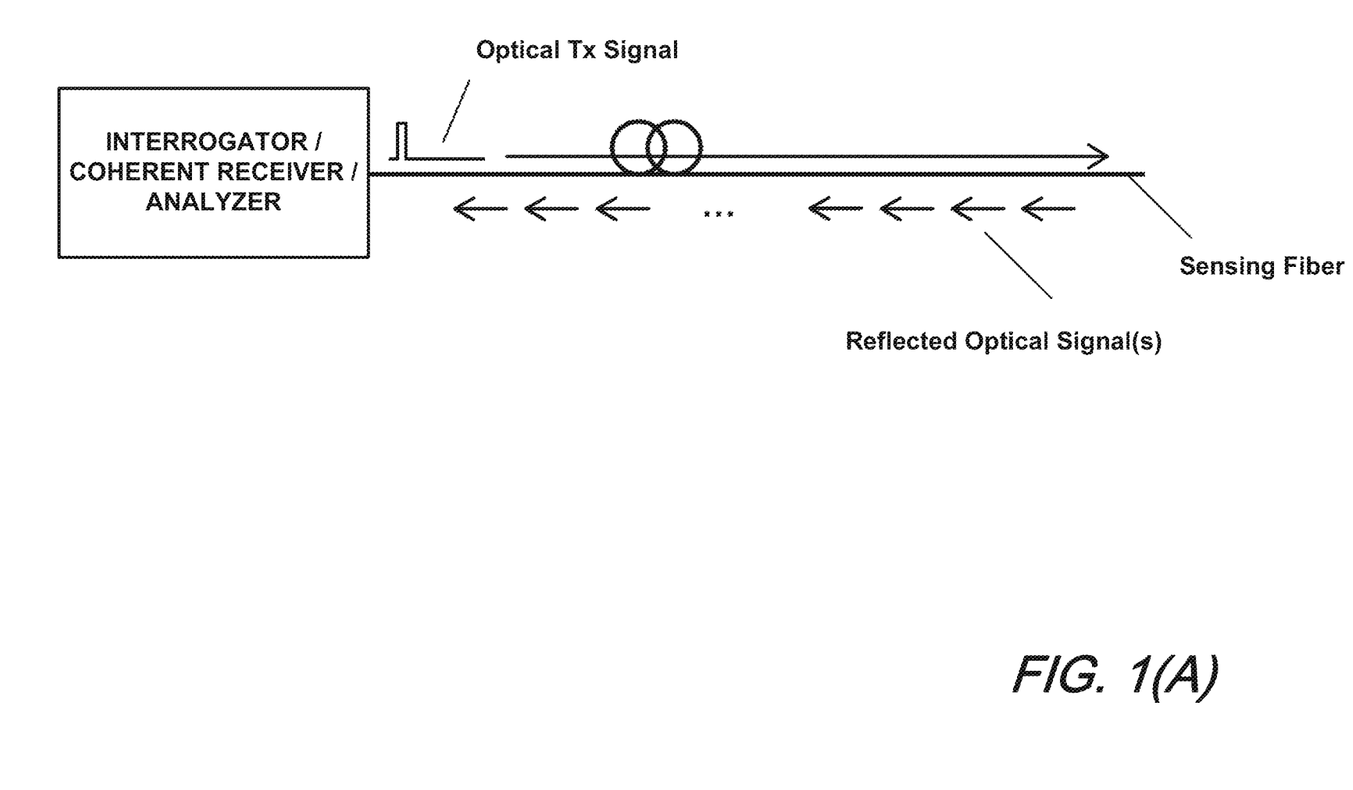
FIG. 1(A) is a schematic diagram of an illustrative prior art DAS arrangement.

FIG. 1(A) shows a simplified schematic diagram of a prior art DFOS/DVS/DAS system employing an interrogator/coherent receiver/detection/analysis system. Operationally, such a system generates/applies an optical Tx signal into an optical sensing fiber which results in reflected/scattered optical signals being directed back to the receiver/analysis system which receives/detects/analyzes the reflected/scattered and subsequently received signals. The signals are analyzed, and an output is generated which is indicative of the environmental conditions encountered along the length of the fiber.

Figure 1B:
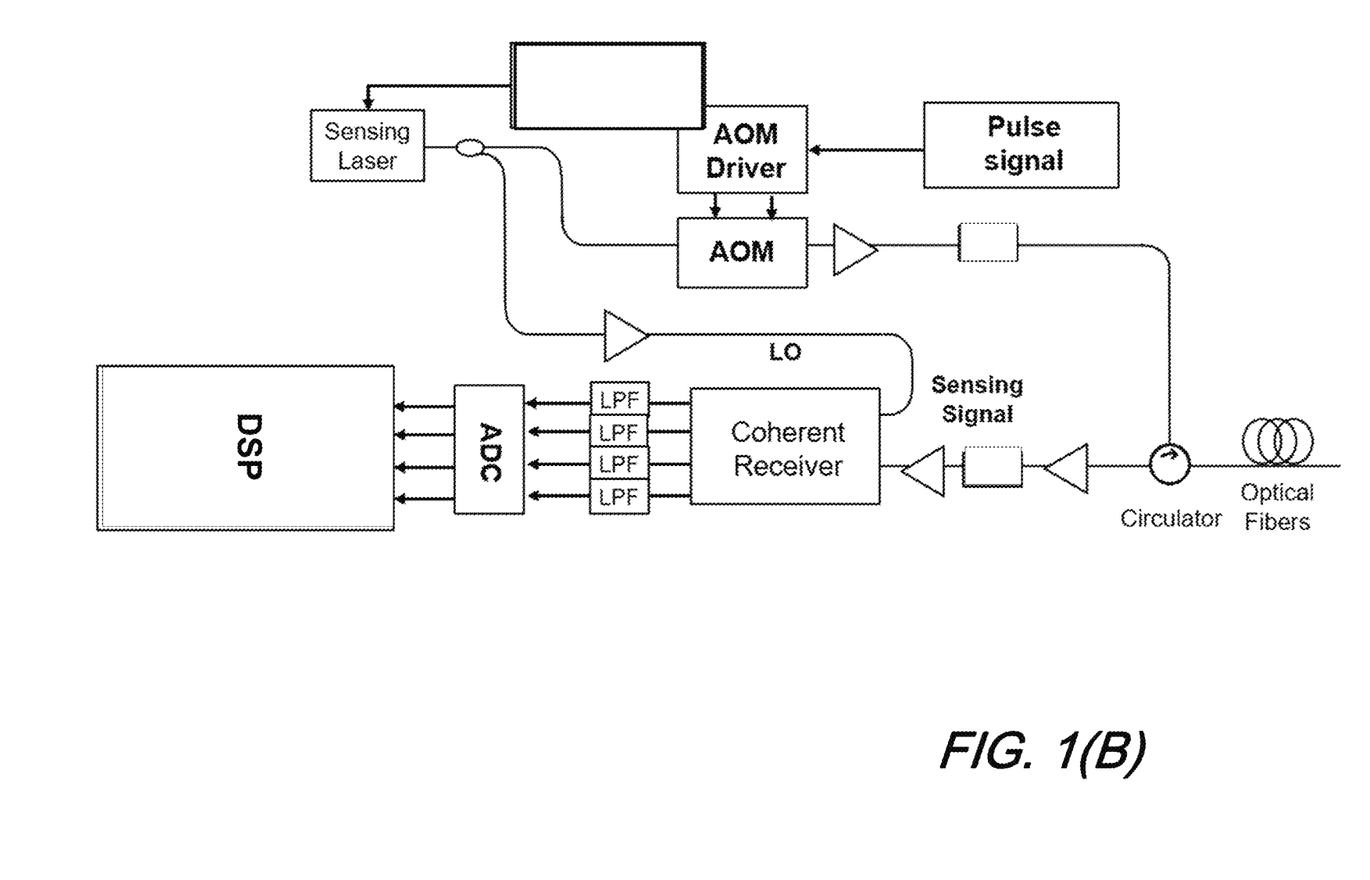
FIG. 1(B) is a schematic diagram of an illustrative coherent DAS arrangement according to aspects of the present disclosure.
Figure 1C:
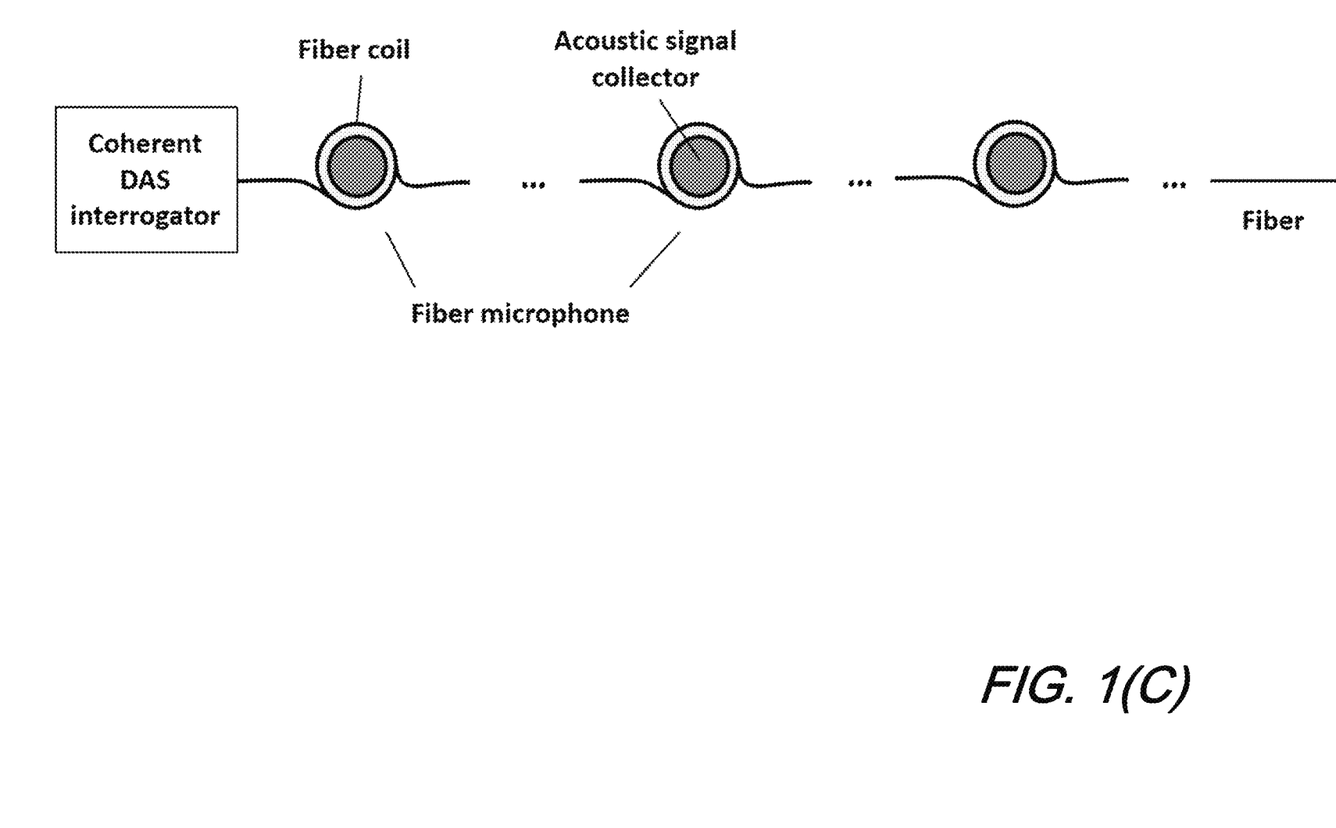
FIG. 1(C) is a schematic diagram of an illustrative DAS arrangement according to aspects of the present disclosure.

FIG. 1(C) shows a distributed acoustic sensing (DAS) arrangement including a coherent DAS interrogator in optical communication with a sensing fiber shown having several fiber sensing coils operating as fiber microphones formed at various locations along the length of the sensing fiber. As used herein, a fiber microphone employs an acoustic signal collector (a material with a shape that is sensitive to an acoustic signal in the environment, that results in a corresponding movement on its surface when it encounters environmental acoustic signals), and a fiber coil wrapped around the signal collector. As will be readily understand and appreciated by those skilled in the art, an acoustic signal sensed by the fiber coil of the microphone section of the sensing fiber can be stored, replayed, and analyzed, to provide a measure real-time environmental acoustic activity.

As those skilled in the art will understand and appreciate, with coherent DAS—a change of phase difference between two detected locations along the length of the sensing fiber is indicative of strain variation(s) of the sensing fiber in between the two locations which is further indicative of sensed environmental acoustic/vibratory signals. As those skilled in the art will readily appreciate, this is the principle of coherent DAS signal detection. Note that the phase difference is usually determined using the inner product of the two samples, which is known in the art as "beating". The distance between the two locations comprising the two samples is called "beating gauge", or "beating taps" if the distance is represented using the number of samples.

Figure 2:
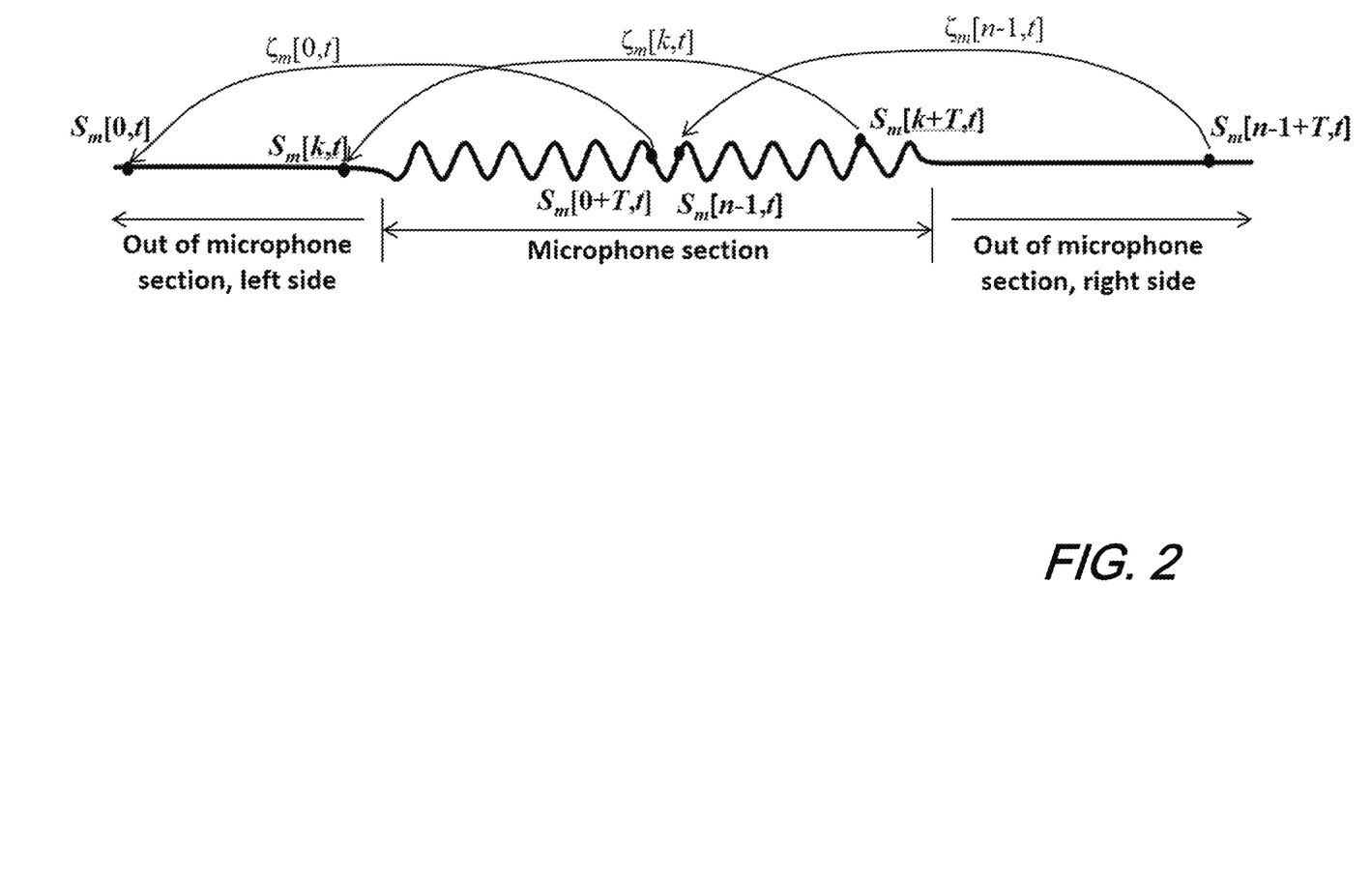
FIG. 2 illustrates beating over a microphone section of optical sensing fiber in the DAS arrangement according to aspects of the present disclosure.

FIG. 2 illustrates beating over a microphone section of optical sensing fiber in the DAS arrangement according to aspects of the present disclosure including a microphone m. Shown further in that figure is $S_m[i,t]$, the sample (either the backscattered signal from a single pulse or the decoded signal from certain coded sequence) from location i, at pulse or frame cycle t. $\zeta_m[i,t]$ is the beating product, using $\zeta_m[i,t]=S_m[i+T,t] \cdot S_m^*[i,t]$, where $S_m^*[i,t]$ is the complex conjugate of sample $S_m[i,t]$, and T is the beating taps.

In one embodiment according to aspects of the present disclosure, the beating products $\zeta_m[i,t]$ (i=0, 1, ..., n−1) are first rotated to $\hat{\zeta}_m[i,t]$, such that a short term averaged phase $\overline{\hat{\zeta}_m[i,t]}$ is aligned with each other for all i, then added together ($\Sigma_{i=0}^{n-1}\hat{\zeta}_m[i,t]$) to generate a single output at time t.

An example phase alignment method has been previously described by the instant Applicant which rotates the complex signal of each location $\zeta_m[i,t]$ by the conjugate of its temporal average $\overline{\zeta_m[i,t]}$, such that $\hat{\zeta}_m[i,t]=\zeta_m[i,t] \cdot \overline{\zeta_m[i,t]}$. In one embodiment, the phase of $\zeta_m[i,t]$ is first extracted and unwrapped over t, then with DC removed the results for i=0, 1, ..., n−1 are averaged to have the output.

Note that $S_m[i,t]$ (i=0, 1, ..., n−1) can be inside or outside of the microphone section, as long as the pair includes at least a portion of the sensing fiber comprising the microphone, i.e., it "covers" either a portion of the microphone or the entire microphone. Advantageously, the sensing fiber location of the starting point $S_m[0,t]$ and end point $S_m[n-1+T,t]$ of a length of the sensing fiber, and the beating taps T, are all run-time, user, or automatically configurable for realizing better performance.

The microphones work in parallel with other DAS functions, such as intrusion detection. For this reason, the beating taps of the microphones and other functions can be set separately.

Beating Taps and Averaging

For the fiber microphone configuration illustrated in FIG. 1, assume that an acoustic signal collector responds linearly to an environmental acoustic signal, and applies strain normally to the fiber. If we let s(t) be the environmental acoustic signal at time t, then the optical signal/s phase change caused by s(t) will be $h_m \cdot s(t)$ across the entire fiber span comprising microphone m, where $h_m$ is a constant. Assume further that there are $M_m$ samples over this fiber span, and for every two neighboring samples the change of phase difference will be $h_m \cdot s(t)/M_m$ (slow changing optical effects such as polarization switching, and phase drifting are not considered to simplify the discussion). If illustrative beating pair A and B spans T taps inside the microphone fiber span, the phase change from the beating product becomes $T \cdot h_m \cdot s(t)/M_m$.

With noise considered and assume further the complex signal amplitude is constant (amplitude variations in actual system will be discussed later), the phase after processing will be $T \cdot h_m \cdot s(t)/M_m + n_A(t) + n_B(t)$ where $n_A(t)$ and $n_B(t)$ are the noise of the beating pair. If we assume it is Gaussian noise along the fiber with variance $\sigma_A^2 = \sigma_B^2 = \sigma^2$, then the signal-to-noise ratio (SNR) is defined by:

$$\frac{T \cdot h_m \cdot s}{\sqrt{(\sigma_A^2 + \sigma_B^2)}} = \frac{T \cdot h_m \cdot s}{\sqrt{2}\sigma}.$$

Figure 3:
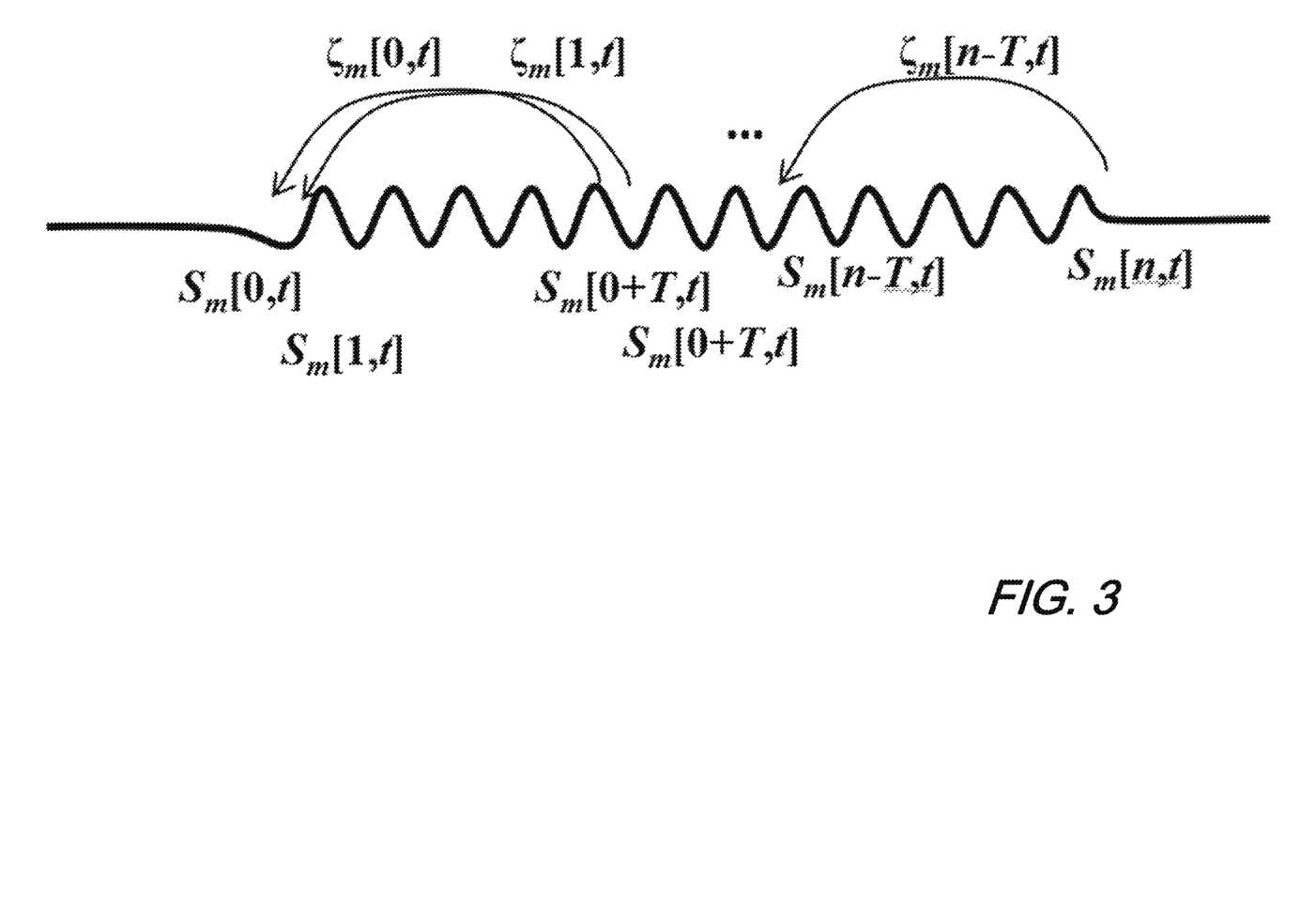
FIG. 3 illustrates beating pairs inside the microphone section of optical sensing fiber in the DAS arrangement according to aspects of the present disclosure.

In one embodiment, the beating pairs are within the microphone section, as shown illustratively in FIG. 3. With reference to that figure, the selected beating tap is T, and the number of samples is (n+1), such that the number of beating pairs is (n−T+1). The complex signals $\zeta_m[k, t]$ can be first aligned to the same averaged direction, and then summed to generate one output.

We note that the process of combining polarization diversity can be achieved using prior art methods. Alternatively, the phase from each of the beating elements are averaged after each DC is removed. For the averaging, when T≤(n−1)/2, each sample will be used twice, except sample 0 and n. The sum of these beating results will have each sample contribute to the noise variance as $(2\sigma)^2$ rather than $2\sigma^2$. For T>(n−1)/2, each sample will be used once, and contribute to the variance of the total noise as $\sigma^2$.

Figure 4:
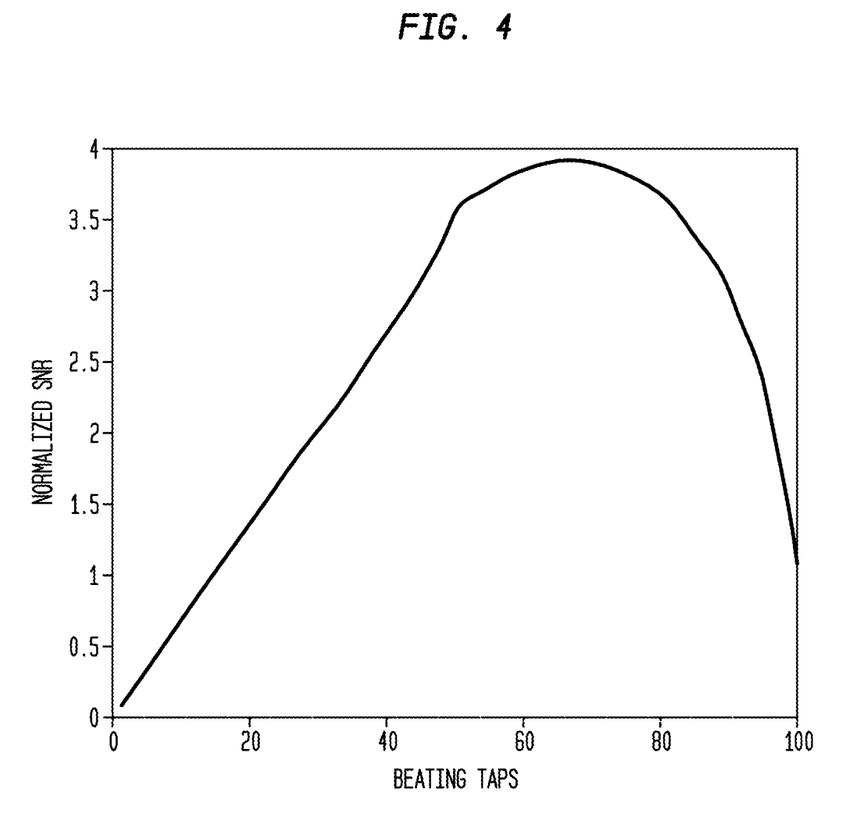
FIG. 4 is a plot illustrating SNR vs beating taps when all beating samples are inside the microphone section of optical sensing fiber in the DAS arrangement according to aspects of the present disclosure.

FIG. 4 is a plot which shows SNR vs beating taps when all the beating samples are inside a microphone section and a calculated SNR when n=101, for different number of beating taps. It can be observed that there is an optimal setting for a given n, so in the actual system, when the number of samples are given, the optimal beating taps can be calculated and configured for highest SNR.

Note that a portion of the sensing fiber that exits out of the microphone section may also be used for this averaging purpose. In some cases, for the frequency band of interest, the fiber is quiet, or the sensed signal spatially cancels each other, so the samples can be considered as noise only, and can be treated as inside of the microphone.

Figure 5:
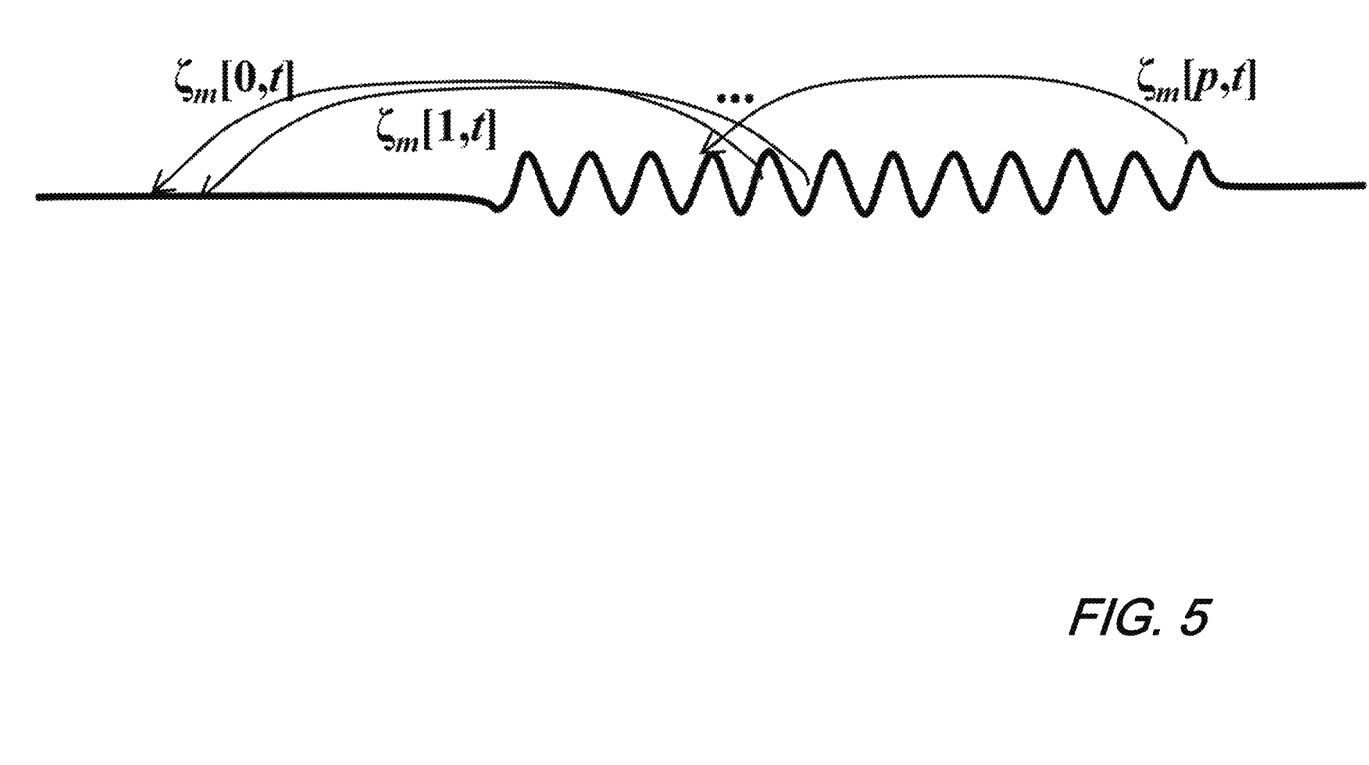
FIG. 5 illustrates an inclusion of a side of microphone fiber in the DAS arrangement according to aspects of the present disclosure.

Turning now to FIG. 5, we consider using fixed beating taps, and use a fiber section shown in the figure to the left to the microphone. When measurements outside of the microphone section are not less than measurements inside of the measurement section, the beating gauge can be set to the microphone fiber length. For an illustrative 100 sample microphone span, changing the starting point a inside the fiber to a+1 as shown in FIG. 6(A), the calculated SNR curve shown in FIG. 6(B) results—from which an optimal parameter a can be found.

Note that when a useable outside length (say q samples) is shorter than the microphone's length (which has n samples), with none of the samples used twice, we employ the following procedure to get an optimal beating tap and averaging parameters.

Figure 6A:
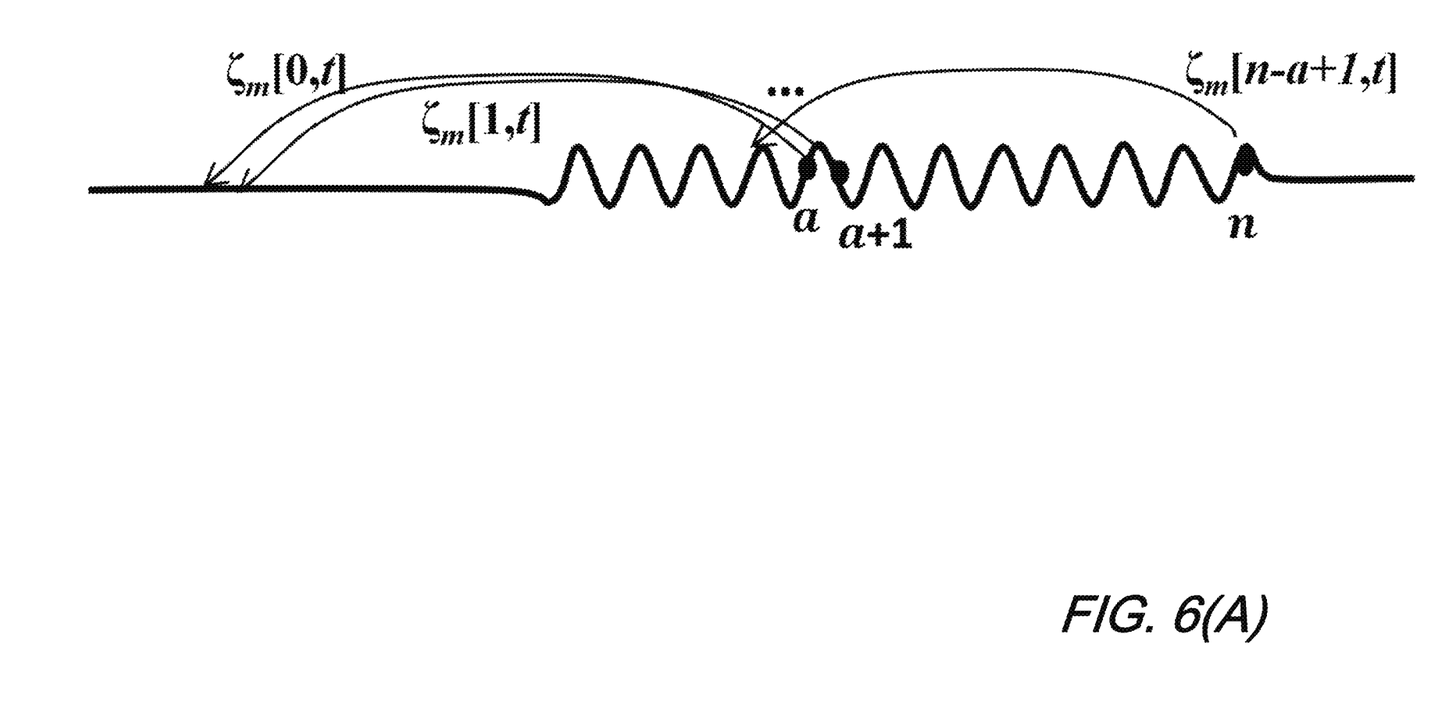
Figure 6B:
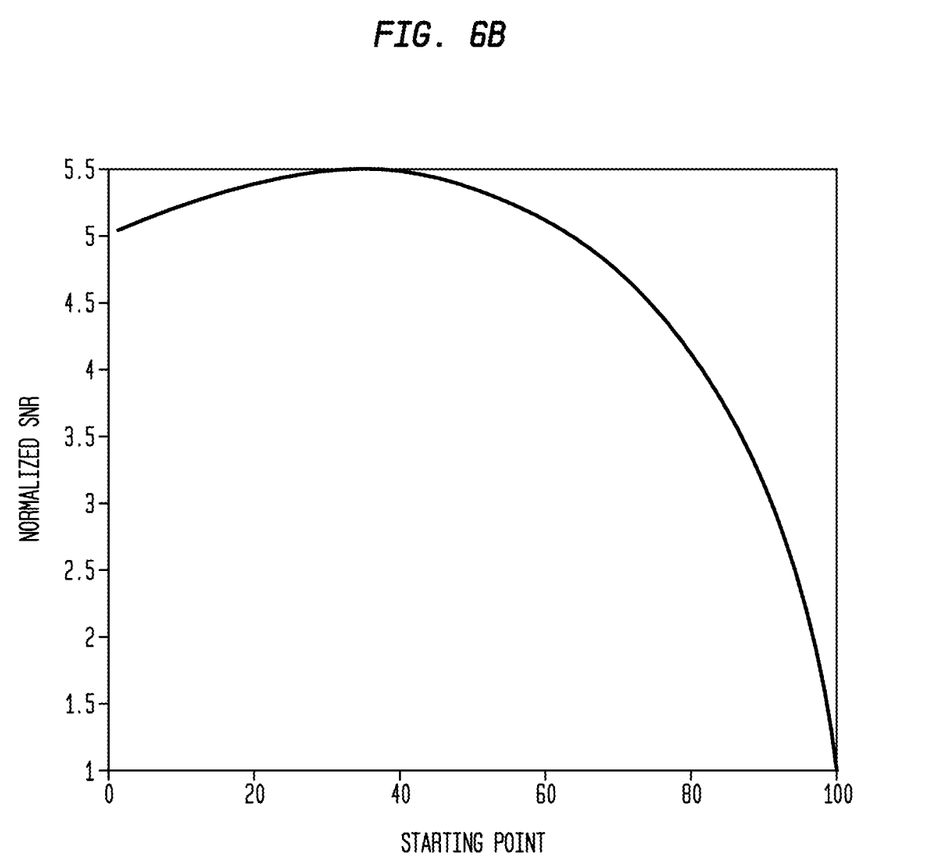

First, assume the outside length is unlimited, to determine an optimal starting point a as shown illustratively in FIG. 6(a).

Figure 7A:
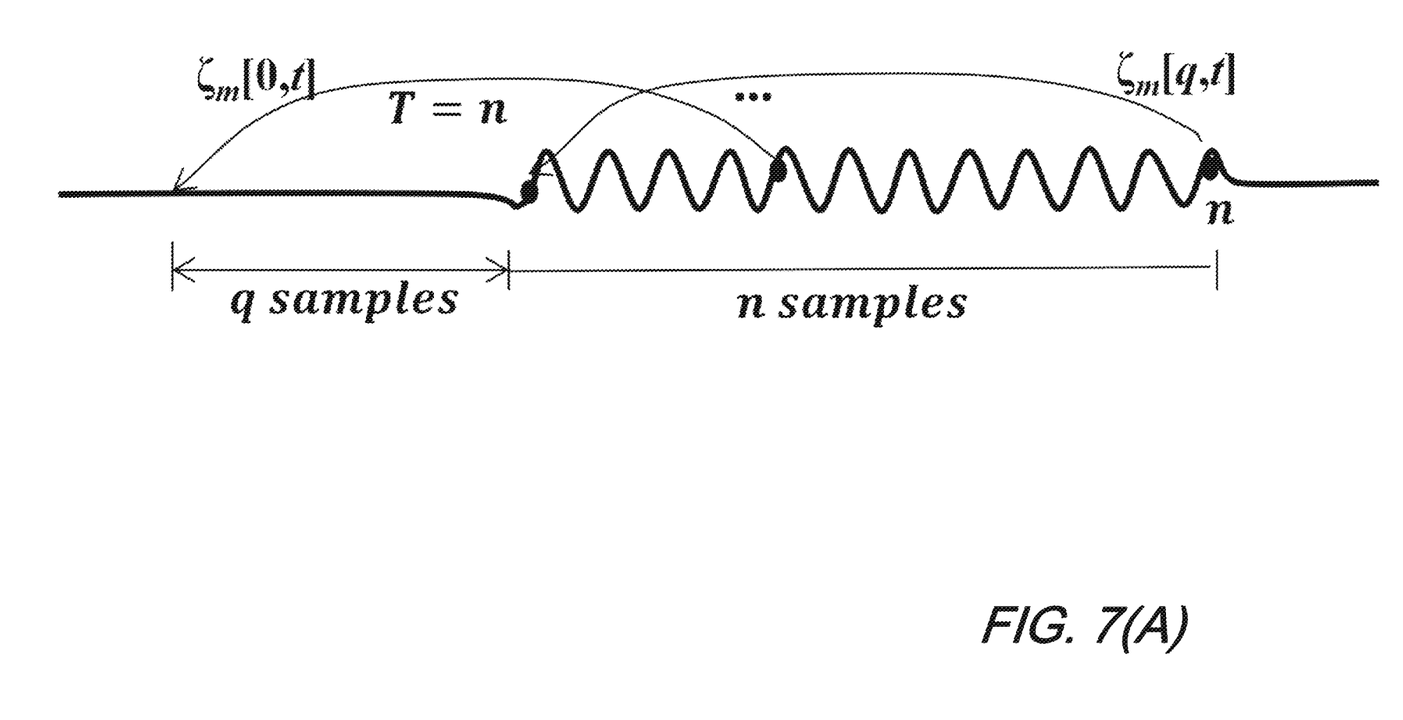

If (q+a)≥n, use n as the beating tap, and a as starting point as illustratively shown in FIG. 7(a), otherwise use the next step.

Figure 7B:
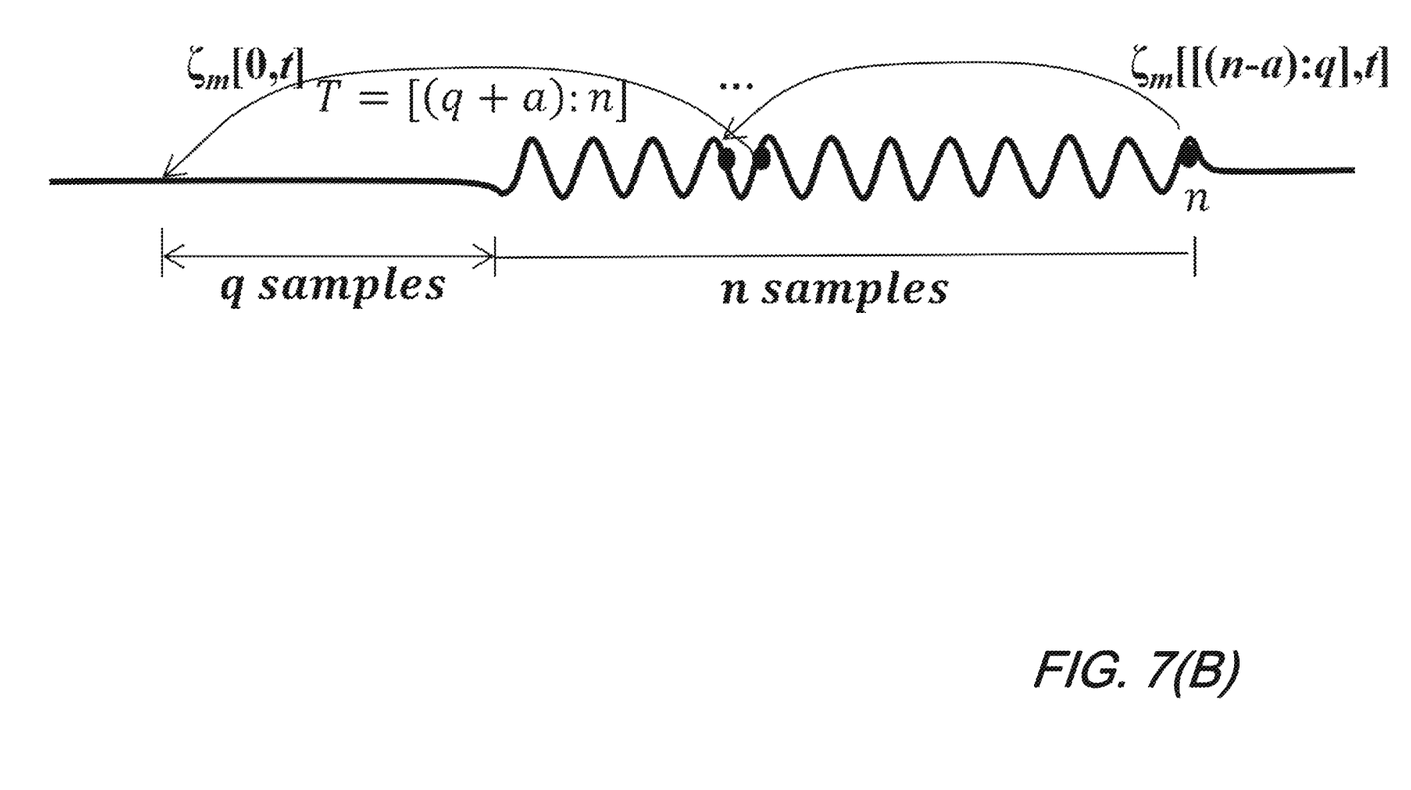

For beating tap in range of (q+a) to n, calculate the averaged SNR as illustratively shown in FIG. 7(b). Use the tap number of the highest SNR as the configured beating tap.

Figure 8:
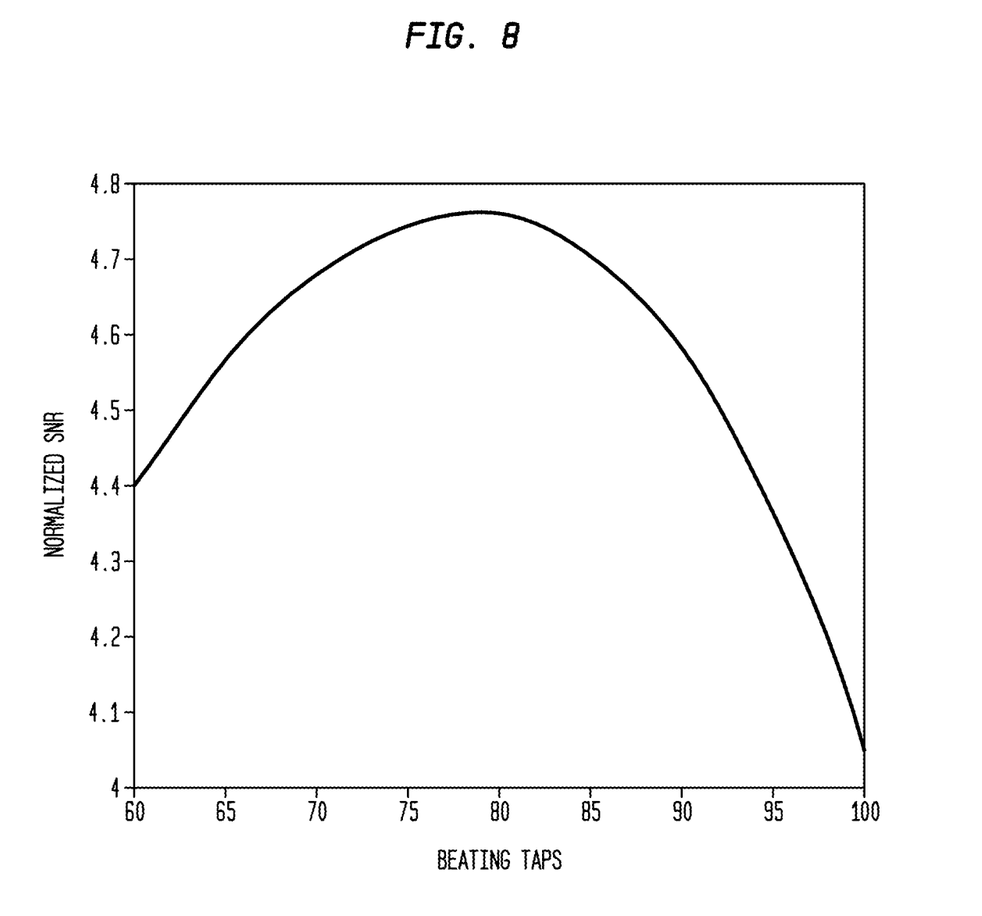
FIG. 8 is a plot of SNR vs beating taps for FIG. 7 when q=20, n=100, according to aspects of the present disclosure.

For example, the SNR curve with n=100, q=20 is shown in FIG. 8. The optimal beating taps can be selected from this curve.

Note that other methods can be applied when out of the microphone section of the sensing fiber. For each location outside of the microphone section of the sensing fiber, calculate the parameters (the beating tap and the starting point) using the above methods. Then for the samples used for portions of the sensing fiber before and after (both sides) the microphone section, we use the pair with larger in-microphone length and ignore the other one.

Selection of Out-of-Microphone Section

Any signal in the acoustic band of interest that occurs at a section of the sensing fiber outside of the microphone section, needs to be avoided in the above averaging method, because it will be added to the final output for all the beating pairs that spans across it.

Figure 9:
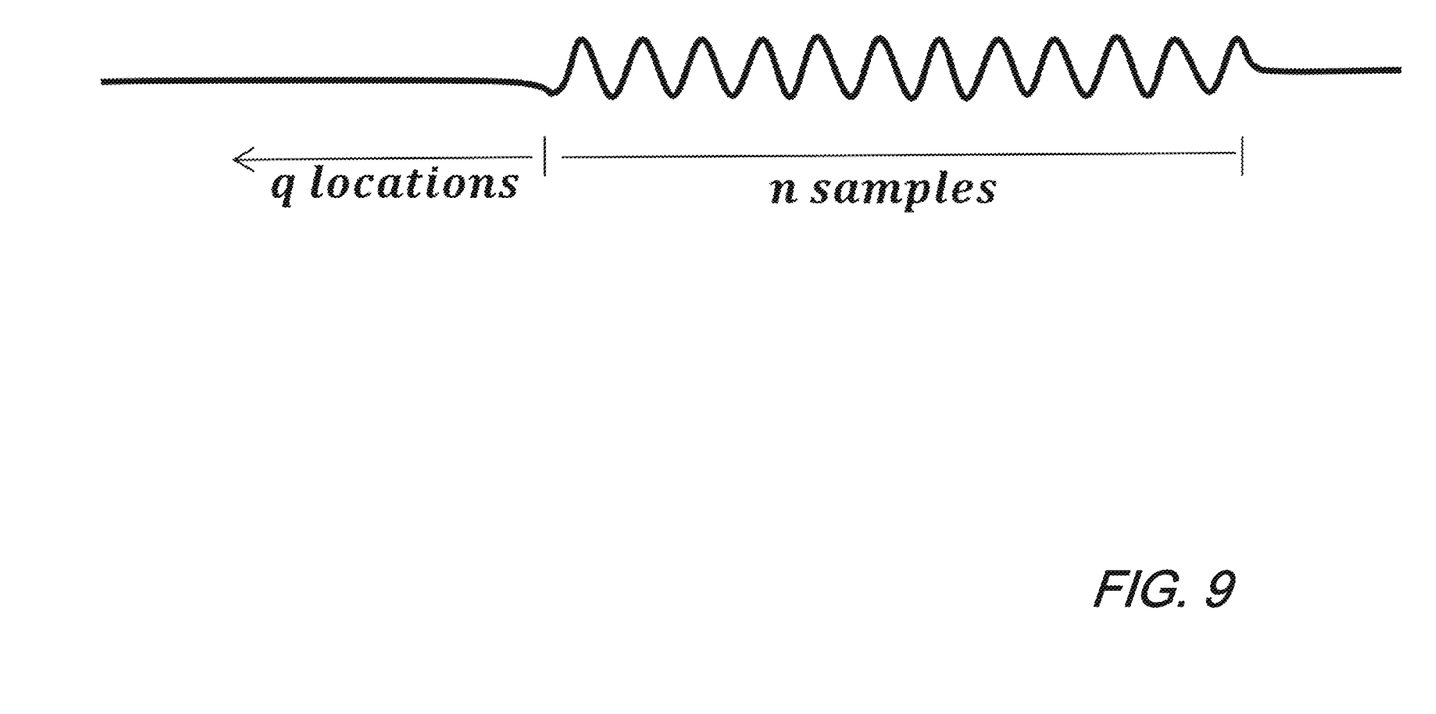
FIG. 9 illustrates spatial averaging for q locations according to aspects of the present disclosure.

One solution to avoid the out-of-microphone signal is using DAS vibration detection feature. Note that an acoustic replay/analysis function related to the microphones mostly runs in parallel with other DAS features, in particular the vibration detection feature. The vibration output can be used to determine a number of usable locations, by taking spatial averaging from sensing fiber locations outside of the microphone section and compare those with a pre-defined threshold. If for a time period $T_a$ the averaged value is lower than the threshold, the entire section can be used for the microphone signal averaging. Note that both the threshold and $T_a$ can be adaptive and the spatial averaging can be for every q (q=1 to n, or for each larger block, such as for q=3, 6, 9, . . . n) as illustratively shown in FIG. 9, to calculate $(\Sigma_{i=1}^{q} v_i)/q$ where $v_i$ is the vibration at the relative location i.

Alternatively, the system may use the instant averaged signal, in similar way as the vibration output but after beating and phase alignment. The out-of-microphone samples selection can also be set as a parameter by upper layer, such as the user interface or the analysis software.

Handling of Signal Fluctuation and Distortion

In operation, a DAS system will exhibit signal fluctuation from Rayleigh effects, and a signal loss along the length of sensing fiber. For both cases, the noise variance can be considered constant, only the signal level changes. A solution to ascertaining the best averaged SNR is made by using the temporal averaged square-root power of each beating pair as a weight, and applying this weight to the corresponding beat result. In complex signal averaging, the equation for this process is expressed as:

$$\Sigma_i |\overline{\zeta_m[1,t]}| \cdot \zeta_m[i,t].$$

At this point, while we have presented this disclosure using some specific examples, those skilled in the art will recognize that our teachings are not so limited. Accordingly, this disclosure should be only limited by the scope of the claims attached hereto.

The invention claimed is:

1. A method providing increased signal-to-noise (SNR) for coherent distributed acoustic sensing (DAS) system, comprising:

generating by an interrogator, interrogating light and sending it into an optical sensing fiber, said optical sensing fiber including one or more fiber microphones, each individual microphone including an acoustic signal collector having a length of the optical sensing fiber wrapped therearound (fiber coil);

detecting by a coherent detector, backscattered light that results from the interrogating light sent into the optical sensing fiber;

generating and outputting by a coherent detector, signals indicative of detected backscattered light; and analyzing by a signal processor, the outputted signals indicative of detected backscattered light and determining strain signals associated with location(s) along the length of the optical sensing fiber that are indicative of a vibration and acoustic environment of the optical sensing fiber at the location(s);

wherein the analyzing determines complex products (beating products) of outputted signals for a pair of locations along the length of the optical sensing fiber that are used to determine a phase change in-between locations along the length of the optical sensing fiber;

wherein the pair of locations are locations that are part of a fiber microphone;

wherein the analyzing determines complex products of outputted signals for a plurality of pairs of locations along the length of the optical sensing fiber that are used to determine a phase change in-between each of the plurality of pairs of locations; and wherein some of the plurality of pairs of locations are locations that are part of a fiber microphone and others of the plurality of pairs of locations are not part of a fiber microphone.

2. A method providing increased signal-to-noise SNR) for coherent distributed acoustic sensing (DAS) system, comprising:

generating by an interrogator, interrogating light and sending it into an optical sensing fiber, said optical sensing fiber including one or more fiber microphones, each individual microphone including an acoustic signal collector having a length of the optical sensing fiber wrapped therearound (fiber coil);

detecting by a coherent detector, backscattered light that results from the interrogating light sent into the optical sensing fiber;

generating and outputting by a coherent detector, signals indicative of detected backscattered light; and analyzing by a signal processor, the outputted signals indicative of detected backscattered light and determining strain signals associated with location(s) along the length of the optical sensing fiber that are indicative of a vibration and acoustic environment of the optical sensing fiber at the location(s);

wherein the analyzing determines complex products (beating products) of outputted signals for a pair of locations along the length of the optical sensing fiber that are used to determine a phase change in-between locations along the length of the optical sensing fiber;

wherein the pair of locations are locations that are part of a fiber microphone;

wherein the analyzing determines complex products of outputted signals for a plurality of pairs of locations along the length of the optical sensing fiber that are used to determine a phase change in-between each of the plurality of pairs of locations;

wherein some of the plurality of pairs of locations are locations that are part of a fiber microphone and others of the plurality of pairs of locations are not part of a fiber microphone; and wherein each of the plurality of pairs comprise a differential pair and one member of the pair is part of a fiber microphone and the other member of the pair is outside of the fiber microphone.

3. A method providing increased signal-to-noise (SNR) for coherent distributed acoustic sensing (DAS) system, comprising:

generating by an interrogator, interrogating light and sending it into an optical sensing fiber, said optical sensing fiber including one or more fiber microphones, each individual microphone including an acoustic signal collector having a length of the optical sensing fiber wrapped therearound (fiber coil);

detecting by a coherent detector, backscattered light that results from the interrogating light sent into the optical sensing fiber;

generating and outputting by a coherent detector, signals indicative of detected backscattered light; and analyzing by a signal processor, the outputted signals indicative of detected backscattered light and determining strain signals associated with location(s) along the length of the optical sensing fiber that are indicative of a vibration and acoustic environment of the optical sensing fiber at the location(s);

wherein the analyzing determines complex products (beating products) of outputted signals for a pair of locations along the length of the optical sensing fiber that are used to determine a phase change in-between locations along the length of the optical sensing fiber;

wherein the pair of locations are locations that are part of a fiber microphone;

wherein the analyzing determines complex products of outputted signals for a plurality of pairs of locations along the length of the optical sensing fiber that are used to determine a phase change in-between each of the plurality of pairs of locations;

wherein some of the plurality of pairs of locations are locations that are part of a fiber microphone and others of the plurality of pairs of locations are not part of a fiber microphone;

wherein each of the plurality of pairs comprise a differential pair and one member of the pair is part of a fiber microphone and the other member of the pair is outside of the fiber microphone; and wherein a starting point inside the fiber microphone section having a distance a from an edge of the microphone along the fiber coil is determined by setting a beating tap to the microphone fiber coil length.

* * * * *